United States Patent
Monga et al.

(10) Patent No.: US 7,656,823 B1
(45) Date of Patent: Feb. 2, 2010

(54) AUTOMATED NETWORK TO SAN TOPOLOGY LINKAGE

(75) Inventors: Indermohan Monga, Acton, MA (US);
Bruce Schofield, Tyngsboro, MA (US);
Pierre Miller, Gatineau (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 597 days.

(21) Appl. No.: 10/978,182

(22) Filed: Oct. 29, 2004

Related U.S. Application Data

(60) Provisional application No. 60/542,116, filed on Feb. 5, 2004.

(51) Int. Cl.
*H04L 12/28* (2006.01)
(52) U.S. Cl. .................................. 370/255; 370/257
(58) Field of Classification Search .................. None
See application file for complete search history.

(56) References Cited

U.S. PATENT DOCUMENTS

| | | | |
|---|---|---|---|
| 6,697,924 B2 * | 2/2004 | Swank .................... 711/163 |
| 6,751,702 B1 * | 6/2004 | Hsieh et al. ................ 711/112 |
| 6,792,479 B2 * | 9/2004 | Allen et al. ................... 710/10 |
| 6,892,264 B2 * | 5/2005 | Lamb ........................ 710/301 |
| 6,925,058 B2 * | 8/2005 | Jones et al. ................. 370/235 |
| 2001/0047460 A1 * | 11/2001 | Kobayashi et al. .......... 711/162 |
| 2004/0054776 A1 * | 3/2004 | Klotz et al. .................. 709/224 |
| 2004/0083284 A1 * | 4/2004 | Ofek et al. ................... 709/224 |
| 2005/0010688 A1 * | 1/2005 | Murakami et al. ........... 709/245 |
| 2007/0094378 A1 * | 4/2007 | Baldwin et al. .............. 709/223 |
| 2008/0201458 A1 * | 8/2008 | Salli ........................... 709/223 |
| 2009/0046731 A1 * | 2/2009 | George et al. ............... 370/404 |
| 2009/0157984 A1 * | 6/2009 | Hara et al. ................... 711/154 |

OTHER PUBLICATIONS

Dakshi Agrawal, Policy-Based Validation of SAN Configuration, Jun. 7, 2004, IEEE, Proceedings. Fifth IEEE International Workshop on Policies for Distributed Systems and Networks, 2004. Policy 2004, pp. 77-86.*

* cited by examiner

*Primary Examiner*—Jayanti K Patel
*Assistant Examiner*—Hooman Houshmand
(74) *Attorney, Agent, or Firm*—Anderson Gorecki & Manaras LLP

(57) ABSTRACT

Collection of topology mapping linkage information between a Storage Area Network ("SAN") and a transparent interconnecting transport network is at least partially automated. Physical topology information is gathered by detecting use of a physical path between a port of a first SAN device and a port of a second SAN device logically proximate to the transport network. This may be accomplished by discovering World Wide Names of end-points in a Fibre Channel SAN, and discovering Media Access Control addresses of end-points in an Ethernet SAN. The discovered physical topology information is then employed with known transport network logical topology information to determine which logical path or paths are associated with the physical path, i.e., to generate a mapping.

18 Claims, 3 Drawing Sheets

AUTOMATED NETWORK TO SAN TOPOLOGY LINKAGE

CROSS-REFERENCE TO RELATED APPLICATIONS

A claim of priority is made to U.S. Provisional Patent Application 60/542,116, entitled AUTOMATED NETWORK TO SAN TOPOLOGY LINKAGE TO GENERATE PHYSICAL AND LOGICAL END TO END TOPOLOGY MAPS, filed Feb. 5, 2004.

FIELD OF THE INVENTION

This invention is generally related to network communications, and more particularly to network-to-SAN topology mapping.

BACKGROUND OF THE INVENTION

Improvements in network communications have enabled introduction of networked services and products that perform functions previously implemented on a relatively local basis. For example, Storage Area Networks ("SANs") provide a storage resource with similar performance to local storage such as Network Attached Storage ("NAS"). A SAN is a subnetwork of shared storage devices that may be employed relatively transparently by devices on a Local Area Network ("LAN") or Wide Area Network ("WAN"). In particular, a SAN architecture allows storage resources such as disk arrays to be shared among multiple network devices such as servers. The disk arrays may be connected to servers via switches with n:m connectivity between servers and disk arrays. One advantage of a SAN is that relatively less underutilized storage results due to an unshared architecture. Further, it is relatively easy to augment storage capacity. Further, fewer costly network servers may be required to support storage operations.

Because SANs are dependent upon the communications network in order to function properly it is desirable to consider network topology when designing, maintaining and troubleshooting a SAN in order to achieve a desired level of performance and reliability. Further, it is generally desirable to have information indicating the effect of particular potential network problems, such as fiber cuts, on SAN operation. Separate techniques for auto-discovery of SAN topology and network topology are known. However, there is no practical technique for auto-discovery of linkage between the SAN and network topologies. The linkage can be manually calculated, but manual processes are prone to human error and require recalculations following topology changes in order to maintain accurate modeling.

SUMMARY OF THE INVENTION

In accordance with the present invention, physical and logical topology mapping s and their linkage information is automated. Physical topology information is gathered by detecting use of a physical path between a port of a first SAN device and a port of a second SAN device in a network in which the first and second SAN devices are interconnected by other network devices such as transport network devices. The interconnecting network devices logically adjacent to the first and second SAN devices may be employed to facilitate detection of the path used by the SAN. The discovered physical topology information is then employed with logical topology information about the interconnecting network to determine which logical path or paths are associated with the physical path, i.e., to generate a physical and logical SAN-to-network mapping.

In the case of a SAN that employs Fibre Channel, the interconnecting network devices may employ World Wide Name snooping to discover physical topology. Fibre Channel is a T11 and ANSI standards-based serial network protocol that is known for use with SANs. Commercially available Fiber Channel equipment includes storage units, switches and devices which bridge to other network protocols such as TCP/IP. Fibre Channel employs World Wide Names ("WWN") which are registered, 64-bit, globally unique identifiers of nodes and ports in a SAN. Consequently, discovery of the WWNs at devices at both ends of a Fibre Channel SAN logically proximate to the interconnecting network provides an indication of physical topology. The physical topology indicators such as the node and port identifiers of ingress and egress Fibre Channel switches are associated with a logical path or paths in the interconnecting network. In particular, the active logical path or paths which interconnect the identified physical path endpoints are selected and identified to generate a mapping. The mapping may then be used to advantage by network designers and managers.

In the case of a SAN which employs Ethernet, Media Access Control ("MAC") addresses may be employed as identifiers of physical topology. Ethernet is an IEEE standards-based network protocol that is known for use with storage, among other things. Commercially available Ethernet equipment includes switches and devices which bridge to other network protocols. Ethernet device interfaces to the network have a unique, registered MAC address which identifies the interface at the MAC layer, i.e., the network layer that directly interfaces with the media such as the cables in a twisted-pair. Consequently, discovery of the MAC addresses at devices at both ends of an Ethernet SAN, such as ingress and egress Ethernet switches logically proximate to the interconnecting network, provides an indication of physical topology. The physical topology indicators, such as node and port identifiers gleaned from the MAC addresses of the ingress and egress Ethernet switches, are associated with the logical path or paths of the interconnecting network which connect the identified physical topology endpoints. In particular, the active logical path or paths which may be associated with the identified physical path are selected and identified to generate a network-to-SAN mapping. The mapping may then be used to advantage by network designers and managers.

One advantage of the invention is that the likelihood of human error causing inaccurate mapping is reduced. Another advantage is that updated mappings may be easily generated, thereby facilitating recalculation of accurate mappings which reflect changes in network topology. Another advantage is that these accurate mappings can be used to easily localize and troubleshoot connectivity problems in the SAN especially when it happens at the connection points between the SAN devices and the interconnecting network.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
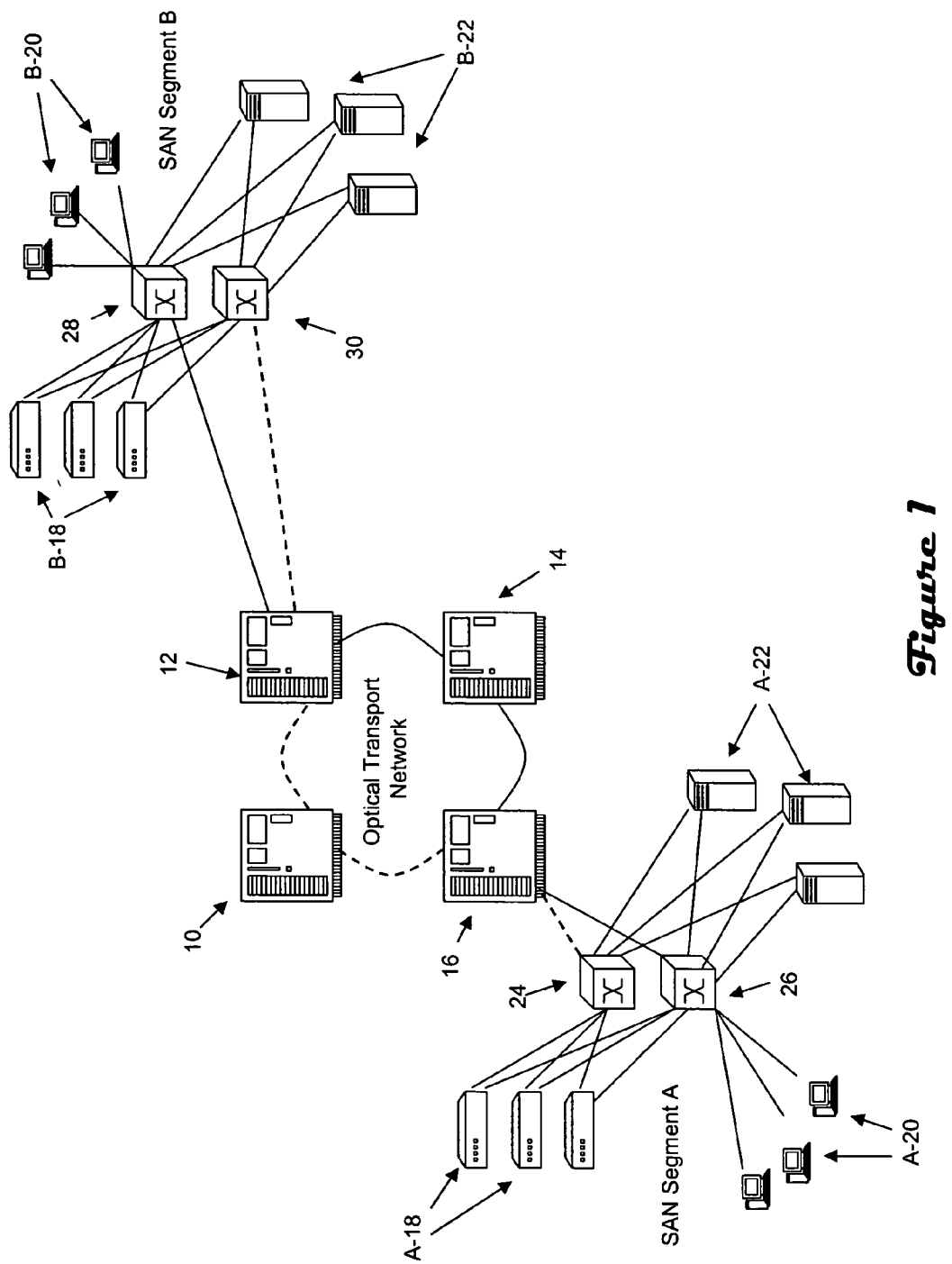
FIG. 1 is a network diagram that illustrates topology mapping where Fiber Channel SAN segments are connected via an optical network.

Referring to FIG. 1, segments A, B, of a SAN are interconnected via an optical transport network. The optical transport network includes optical switches 10, 12, 14, 16 which are connected in a SONET/SDH ring architecture. It should be recognized however that the optical switches could alternatively be connected in a mesh architecture. Each SAN segment includes servers 18, hosts 20 and storage arrays 22 that are interconnected via Fibre Channel switches 24, 26, 28, 30. The Fiber Channel switches provide connectivity between devices in the SAN segment, and also to the optical network. The Optical segments may employ the Generic Framing Procedure ("GFP") protocol which includes an encapsulation method that allows Fibre Channel SAN traffic to be carried efficiently over SONET/SDH networks.

The optical transport network is transparent to the SAN devices. In particular, SAN devices have sufficient information to identify other devices in the SAN, including devices in other SAN segments, but do not initially have information indicating particular logical paths through the optical network. Information indicating the logical topology of the optical network is known within the domain of the optical network. For example, such information may be gathered via management plane applications as is known in the art.

Discovery of the linkage between the SAN topology and the optical network topology is initiated by determining where SAN network segments are connected at the edge of the optical network. The optical switches 10, 12, 14, 16 may include power management features which enable the optical switches to locate devices within their network. Ingress ports or fibers may be examined to determine whether they are being utilized by a SAN device. In the case of a Fibre Channel SAN and an optical interconnecting network, this may be implemented by monitoring for exchange of Fibre Channel protocol traffic before GFP encapsulation by the optical devices. Alternatively, SAN agents may be implemented to discover coupled optical switches, and signal to the optical network to indicate connections between the SAN segments and the optical network. With either technique, the result is information which indicates points of connection between the SAN segments and the optical transport network. However, this information alone does not indicate associations between points of connection, and the connections may be numerous depending on the number and capacity of the SAN segments.

Having identified the SAN-to-network connection points, discovery of topology linkage information is initiated. The Fibre Channel protocol employs World Wide Names ("WWN") which are registered, 64-bit, globally unique identifiers of nodes and ports in a SAN. Edge devices of the optical network, such as the optical switches 16, 12 that interface with SAN devices 24 and 28 respectively, discover WWNs being employed by the SAN devices by examining transmitted traffic. For example, Fibre Channel logins and primitives indicate the WWN of both the ingress Fibre Channel switch 24 and the egress Fiber Channel switch 28. The result of the discovery process is a data set such as: ((device$_{ingress}$ ID, port ID), (device$_{egress}$ ID, port ID)), where the identified devices are Fibre Channel switches 24, 28 and the ports are the connecting ports on the Fibre Channel switches. The data set provides an indication of physical topology. Each identifier of the data set may then be associated with identifiers of the connecting port and device of the optical network. For example, the optical network edge device 16 could determine that the Fibre Channel switch 24, Port 5 is connected to the optical network at switch 16, Port 7, exchanging data with Fibre Channel switch 28, Port 3 via optical network edge device 12, Port 6.

The association of the SAN physical topology indicators with particular optical network switches and ports is employed to obtain logical topology information available from the optical network management plane. In particular, the active logical path or paths which connect the identified ingress and egress points of the physical topology are selected to generate a mapping. For example, it could be determined that the only logical path connecting the physical topology indicators is Layer 0=Lambda red, Layer 1=STS {D,B}. The mapping may also indicate the physical location of devices, e.g., Physical Location of switch 12=Boston. The mapping may then be used to advantage by network designers and managers. For example, the mapping may be provided to SAN management software.

Figure 2:
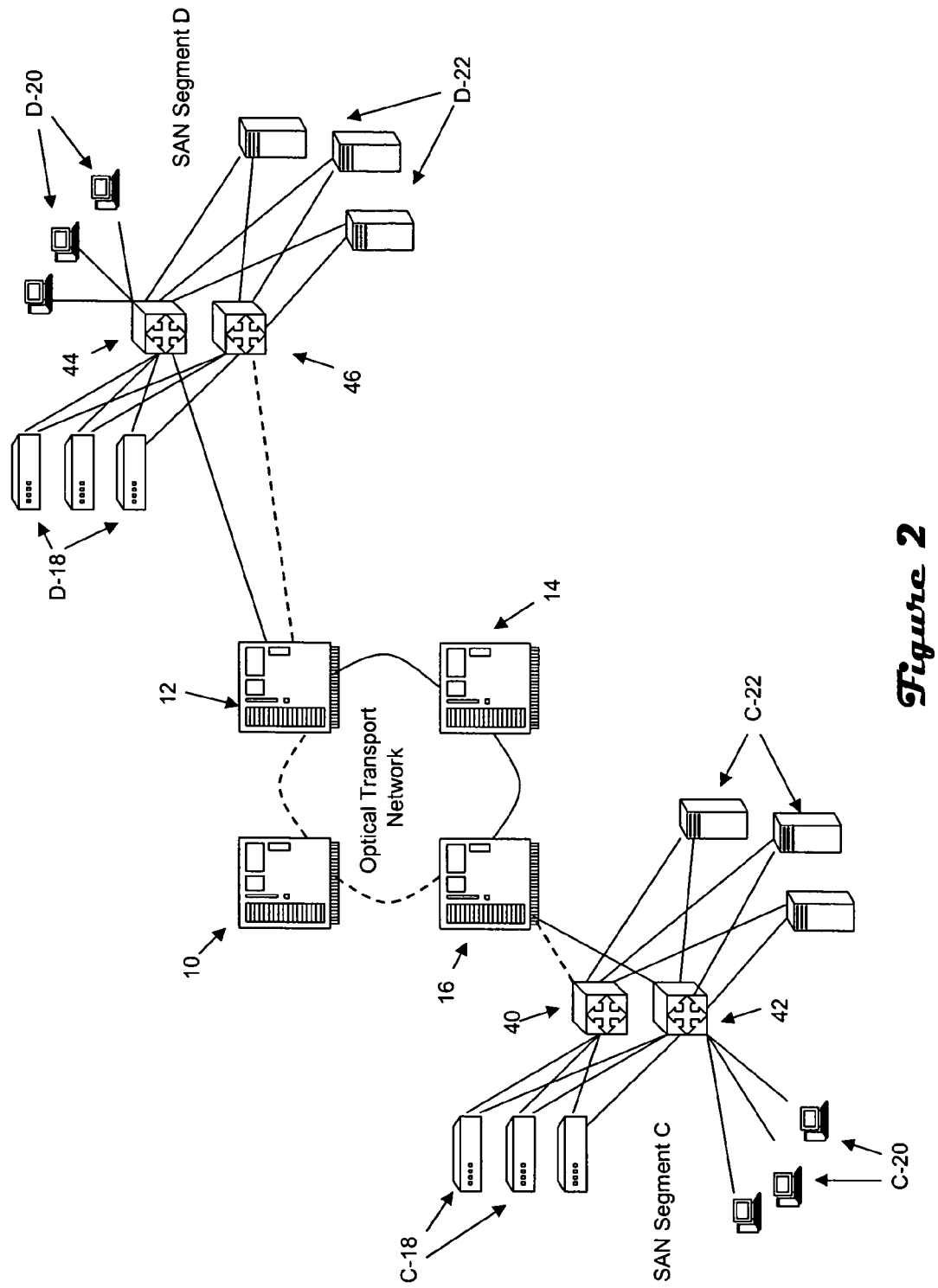
FIG. 2 is a network diagram that illustrates topology mapping where Ethernet SAN network segments are connected via an optical network.

Referring now to FIG. 2, the inventive technique may also be employed where Ethernet LAN SAN segments C, D are interconnected by an optical transport network. Similar to the previous example, the optical transport network is transparent to the Ethernet devices. Discovery of the linkage between the Ethernet topology and the optical network topology is initiated by determining the connection points at which Ethernet network segments C, D are connected at the edge of the optical network, i.e., optical switches 10, 14. Lit fibers or active cables are examined by optical switches 10, 12 to determine whether they are being utilized by Ethernet devices. This may be implemented by monitoring for exchange of Ethernet protocol traffic. Alternatively, Ethernet SAN agents and software may be implemented to discover coupled optical switches, and signal to the optical network to indicate connections between the Ethernet segments and the optical network. Software capable of auto-discovering the Ethernet LAN topology and interconnections is known in the art, e.g., Hewlett-Packard Open View ("HPOV"). With either technique, the result is information which indicates the optical switch and port on which the Ethernet SAN traffic is carried.

Ethernet Media Access Control ("MAC") addresses provide an indication of physical topology. Ethernet device interfaces to the network each have a unique, registered MAC address which identifies the interface at the MAC layer, i.e., the network layer that directly interfaces with the media such as the cables in a twisted-pair. Consequently, discovery of the MAC addresses at the devices at the ingress and egress ends of interconnected Ethernet segments, e.g., Ethernet switches 40, 42, 44, 46, provides an indication of physical topology similar to the WWN pairings described above. In the illustrated example the optical network edge device 10 could determine that Ethernet switch 40, Port 2, is connected to optical network switch 10, Port 3, exchanging data with Ethernet switch 46, Port 7 via optical network switch 14, Port 4.

The association of particular Ethernet physical topology indicators with particular optical network switches and ports is employed to obtain logical topology information available from the optical network management plane. In particular, the active logical path or paths which connect the identified ingress and egress points of the physical topology are selected to generate a mapping. In the illustrated example it could be determined that the only logical path connecting the physical topology indicators is Layer 0=Lambda blue, Layer 1=STS {C, D}. The mapping may also indicate the physical location of devices, e.g., physical Location switch 14=New York. The mapping may then be used to advantage by network designers and managers.

Figure 3:
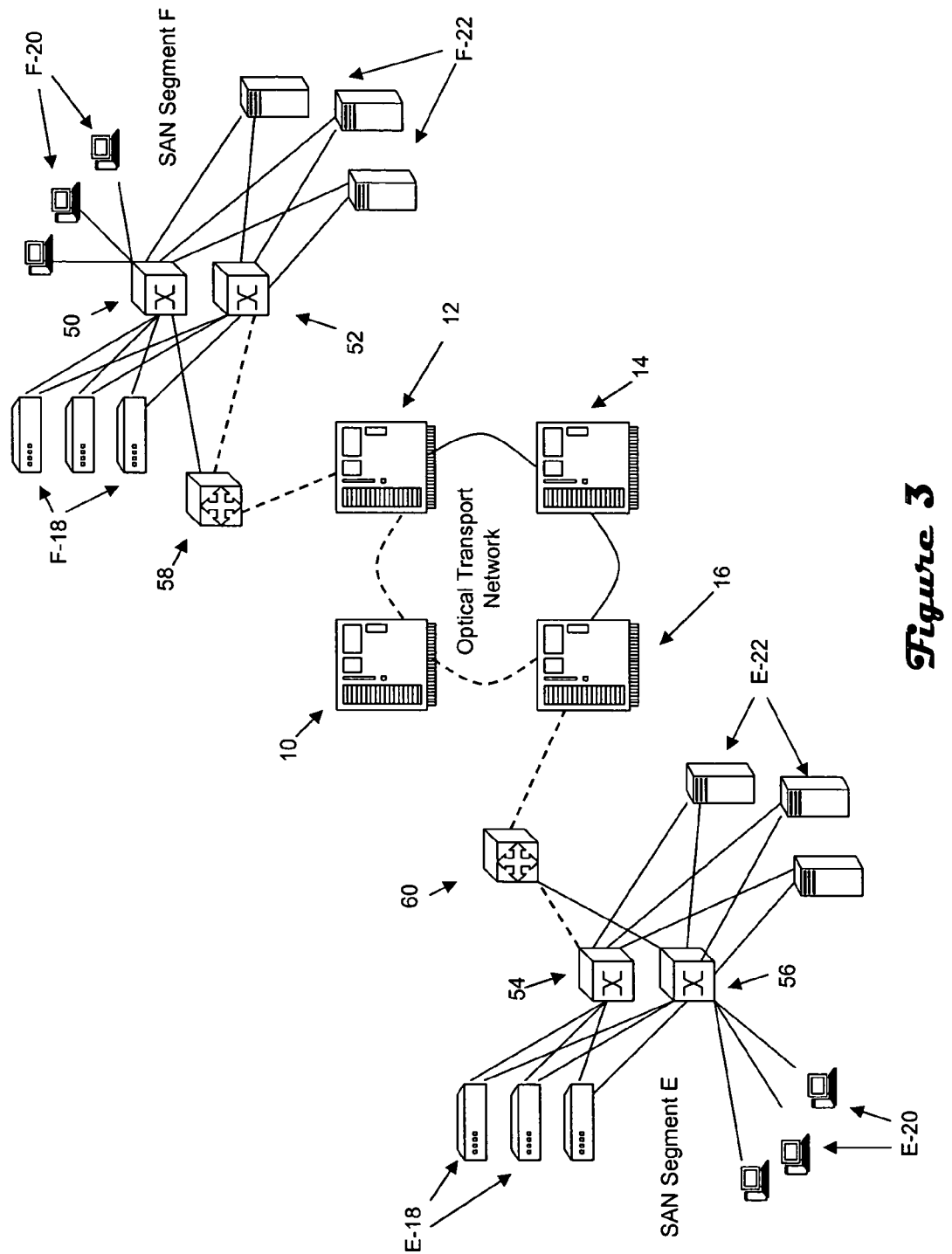
FIG. 3 is a network diagram that illustrates topology mapping where Fibre Channel SAN segments are connected via Ethernet network segments to the optical transport network.

Referring to FIG. 3, the technique may also be employed where SAN segments E, F include Fiber Channel switches 50, 52, 54, 56 connected via an Ethernet VLAN associated with Ethernet switches 58, 60, which exchange data via the optical network. Initially, a mapping between the Ethernet switches 58, 60 via optical-network switches 16, 10, 12 is discovered by employing MAC address association technique already described above. A mapping between the Ethernet switches 58, 60 and the Fibre Channel switches 50, 52, 54, 56 is generated by discovering associations between MAC addresses and WWNs. For example, WWNs used at the interconnection point between the Fibre Channel switch 54 and Ethernet switch 60 may be discovered in a manner similar to discovery of Fibre Channel-optical transport network interconnection points as described above. Associating the discovered WWN employed by Fiber Channel switch 54 with a MAC address of the port being employed by Ethernet switch 60 provides a data set that may be used to link the Fiber Channel topology with the already-discovered Ethernet topology. A tool such as HPOV may be employed to discover the topology of the Ethernet portion of a SAN segment and discover the association between the MAC address of the SAN ingress port and SAN egress port of Ethernet switch 60. Having discovered the association between the MAC addresses, the linkage between Fiber Channel topology and Ethernet topology is apparent. Hence, an end-to-end topology linkage mapping is provided which may be used to advantage.

In view of the description above, it will be understood by those of ordinary skill in the art that modifications and variations of the described and illustrated embodiments may be made within the scope of the inventive concepts. Moreover, while the invention is described in connection with various illustrative structures, those of ordinary skill in the art will recognize that the invention may be employed with other structures. Accordingly, the invention should not be viewed as limited except by the scope and spirit of the appended claims.

The invention claimed is:

1. A method for auto-discovering a mapping between a first Storage Area Network ("SAN") segment and a second SAN segment which are in communication via devices in a transparent interconnecting network which do not provide information indicative of linkage to the SAN segments in response to requests comprising the steps of:
   discovering an ingress from the first SAN segment to the interconnecting network by detecting use of a first physical path in the network and traffic of a first protocol on the first physical path;
   identifying a SAN device in the first SAN segment and a SAN device in the second segment by detecting first and second globally unique device identifiers from the traffic of the first protocol on the first physical path;
   discovering an egress to the second SAN segment from the interconnecting network by detecting use of a second physical path in the network and traffic of the first protocol on the second physical path;
   identifying the SAN device in the first SAN segment and the SAN device in the second segment by detecting the first and second globally unique device identifiers from the traffic of the first protocol on the second physical path; and
   generating a mapping by associating the ingress and egress with at least one logical path of the interconnecting network, where the logical path interconnects the ingress and egress where matching pairs of globally unique device identifiers are identified, the mapping representing at least some physical devices and physical links of the interconnecting network that are traversed by the traffic.

2. The method of claim 1 comprising the further steps of discovering use of a first optical fiber at the ingress and a second optical fiber at the egress.

3. The method of claim 1 comprising the further steps of detecting Fibre Channel traffic at the ingress and the egress.

4. The method of claim 1 comprising the further step of discovering a Fibre Channel World Wide Name indicative of the ingress.

5. The method of claim 4 comprising the further step of discovering a Fibre Channel World Wide Name indicative of the egress.

6. The method of claim 1 comprising the further steps of discovering use of a first electrical cable at the ingress and a second electrical cable at the egress.

7. The method of claim 1 comprising the further steps of detecting Ethernet traffic at the ingress and the egress.

8. The method of claim 1 comprising the further step of discovering an Ethernet Media Access Control address indicative of the ingress.

9. The method of claim 8 comprising the further step of discovering an Ethernet Media Access Control address indicative of the egress.

10. Apparatus operative to auto-discover a mapping between a first Storage Area Network ("SAN") segment and a second SAN segment which are in communication via devices in a transparent interconnecting network which do not provide information indicative of linkage to the SAN segments in response to requests comprising the steps of:
    circuitry operative to discover an ingress from the first SAN segment to the interconnecting network by detecting use of a first physical path in the network and traffic of a first protocol on the first physical path;
    program code operative to identify a SAN device in the first SAN segment and a SAN device in the second segment by detecting first and second globally unique device identifiers from the traffic of the first protocol on the first physical path;
    circuitry operative to discover an egress to the second SAN segment from the interconnecting network by detecting use of a second physical path in the network and traffic of the first protocol on the second physical path;
    program code operative to identify the SAN device in the first SAN segment and the SAN device in the second segment by detecting the first and second globally unique device identifiers from the traffic of the first protocol on the second physical path; and
    program code operative to generate a mapping by associating the ingress and egress with at least one logical path of the interconnecting network, where the logical path interconnects the ingress and egress where matching pairs of globally unique device identifiers are identified, the mapping representing at least some physical devices and physical links of the interconnecting network that are traversed by the traffic.

11. The apparatus of claim 10 further comprising circuitry operative to discover use of a first optical fiber at the ingress and a second optical fiber at the egress.

12. The apparatus of claim 10 further comprising circuitry operative to detect Fibre Channel traffic at the ingress and the egress.

13. The apparatus of claim 10 further comprising circuitry operative to discover a Fibre Channel World Wide Name indicative of the ingress.

14. The apparatus of claim 13 further comprising circuitry operative to discover a Fibre Channel World Wide Name indicative of the egress.

15. The apparatus of claim 10 further comprising circuitry operative to discover use of a first electrical cable at the ingress and a second electrical cable at the egress.

16. The apparatus of claim 10 further comprising circuitry operative to detect Ethernet traffic at the ingress and the egress.

17. The apparatus of claim 10 further comprising circuitry operative to discover an Ethernet Media Access Control address indicative of the ingress.

18. The apparatus of claim 17 further comprising circuitry operative to discover an Ethernet Media Access Control address indicative of the egress.

* * * * *